United States Patent [19]

de Gennes

[11] 4,108,295

[45] Aug. 22, 1978

[54] INERTIA-BRAKE CONTROL FOR INPUT SHAFT OF GEAR BOX, AND ITS APPLICATION TO CLUTCHES AND UNITS FORMED BY A CLUTCH AND A GEAR-BOX

[75] Inventor: Gerard de Gennes, Senlis, France

[73] Assignee: Societe Anonyme Francaise du Ferodo, Paris, France

[21] Appl. No.: 655,964

[22] Filed: Feb. 6, 1976

[30] Foreign Application Priority Data

Feb. 11, 1975 [FR] France ................................. 75 04156

[51] Int. Cl.$^2$ ............................................. F16D 13/75
[52] U.S. Cl. ............................. 192/111 A; 192/13 R; 188/196 B
[58] Field of Search ......................... 192/13 R, 111 A; 188/196 B, 71.8

[56] References Cited

U.S. PATENT DOCUMENTS

| | | | |
|---|---|---|---|
| 2,592,751 | 4/1952 | Serednicky et al. | 192/13 R |
| 3,202,247 | 8/1965 | Schmidt et al. | 192/111 A X |
| 3,365,029 | 1/1968 | Swift | 188/196 B X |
| 3,458,017 | 7/1969 | Szymski | 188/196 B X |
| 3,459,282 | 8/1969 | Hoenick et al. | 188/196 B X |
| 3,722,643 | 3/1973 | Kempf et al. | 192/13 R |
| 3,942,617 | 3/1976 | Poon | 192/111 A |

FOREIGN PATENT DOCUMENTS 2,345,774   3/1974   Fed. Rep. of Germany ........ 192/13 R Primary Examiner—Benjamin W. Wyche
Attorney, Agent, or Firm—Charles E. Brown

[57] ABSTRACT

The invention relates to an operating control device for an automobile engine assembly unit comprising successively a clutch and a gear-box equipped with an inertia brake, the control comprising a pressure plate carried on a declutching stop and adapted, by an axial displacement of the clutch in the direction of action, to apply a friction disc against a reaction surface on the casing of the gear-box, the disc being keyed for rotation with the input shaft of the gear-box while remaining axially slidable on this shaft; the control device further comprises a unidirectional axial coupling device located between the declutching stop and the pressure plate, this unidirectional coupling permitting an axial sliding movement of the pressure plate only in the direction opposite to the direction of action, and retaining members intended to engage the pressure plate when the declutching stop moves in the direction opposite to its direction of action. The declutching stop acts by traction or by thrust, the pressure plate thus acting conversely by thrust or by traction.

The invention is applicable in particular to clutch-gearbox units fitted with inertia brakes.

22 Claims, 13 Drawing Figures

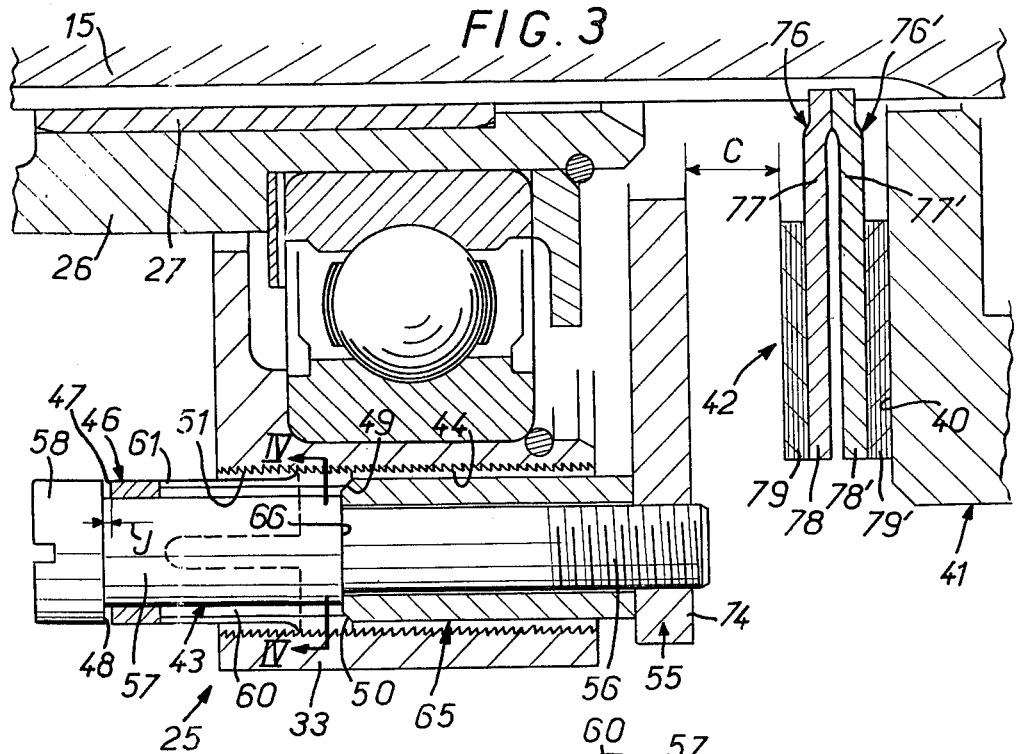
FIG. 3
FIG. 4
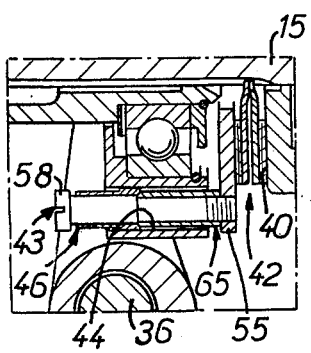
FIG. 5
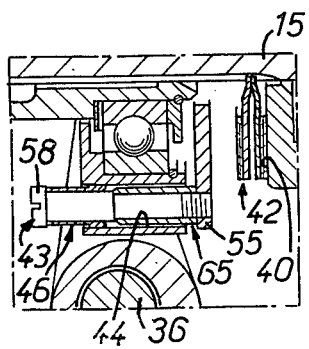
FIG. 6
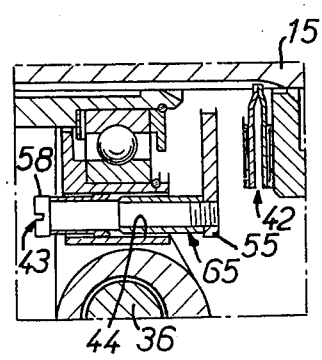
FIG. 7

INERTIA-BRAKE CONTROL FOR INPUT SHAFT OF GEAR BOX, AND ITS APPLICATION TO CLUTCHES AND UNITS FORMED BY A CLUTCH AND A GEAR-BOX

The present invention relates generally to assembly units for engines, especially for engines of automobile vehicles, which comprise successively a clutch and a gear-box, and is more particularly directed to such assemblies in which the gear-box is equipped with an inertia-brake.

The pinions of certain gear-boxes which are relatively simple and therefore particularly strong and cheap, are not provided with any synchronizing device.

The result is, when driving vehicles equipped with such gear-boxes, that is sometimes necessary to wait for a relatively long time during a change of gears, before being able to engage the new gear-ratio selected, especially when this engagement is effected when stopped or on a severe slope.

In this case, it is in fact necessary, as a result of inertia forces, to wait until the pinions of the gear-box corresponding to the new gear-ratio selected have themselves reached the synchronization speed which permits engagement of this gear.

In order to overcome this drawback, it has already been proposed to provide gear-boxes of this type with an inertia brake comprising a reaction surface coupled to the casing of the gear-box, a friction disc which is keyed for rotation on the input shaft of the gear-box while being axially movable along the said shaft, and a control coupled to the declutching stop associated with the clutch and forming with the gear-box the assembly considered.

In practice, an inertia-brake control comprises pressure means carried by the declutching stop and intended, in response to the displacement of this stop in the axial direction corresponding to declutching, known hereinafter as the direction of action, whether the declutching stop acts by traction or by thrust, to apply against a reaction surface coupled to the casing of the gear-box, a friction disc which is keyed for rotation on the input shaft of the gear-box while at the same time it is movable axially along the said shaft.

Thus, during its operation on declutching, the declutching stop continually follows two paths, namely a first so-called declutching path, along which it ensures in the usual manner the declutching of the input shaft of the gear-box with respect to the corresponding driving shaft, and a second so-called braking path, during which it continues its declutching action and at the end of which it ensures the clamping of the friction disc keyed on the said input shaft and thus causes the desired slowing-down of this latter.

However, during the course of wear of the friction disc with which the clutch is provided in the usual way, the position of rest of the declutching stop which corresponds to the engaged position of the clutch, is modified with respect to the gear-box, and the result is that the part of the travel of the declutching stop associated with the control of the inertia brake of the gear-box, as referred to above, becomes reduced until it is ultimately annulled.

In order to remedy this drawback, it has already been proposed in clutch-gear-box units of this type, to carry out periodically, by means of a spanner for example, a mechanical adjustment intended to bring the declutching stop into its initial position of rest.

An adjustment of this kind is particularly awkward and difficult to effect by reason of the lack of accessibility of the parts concerned.

As an alternative, in other clutch-gear box units of this type, it has been proposed to provide the clutch with means for permitting automatic take-up of the wear due to their friction disc.

Means of this kind are however relatively expensive. Furthermore, they are relatively fragile and thus adversely affect the robustness which is also desired for units of this type.

The present invention has generally for its object to avoid the consequences due to wear of the friction disc of the clutch of a clutch-gear box unit with an inertia brake, by advantageously conciliating the necessary conditions of robustness applied to such a unit and the advantages of automatic operation.

In a more precise manner, the present invention has first of all for its object an inertia brake control for the input shaft of a gear-box, of the kind comprising pressure means carried by a declutching stop and adapted, in response to an axial displacement of this stop in one direction, hereinafter termed the direction of action, to apply against a reaction surface coupled to the casing of the said gear-box a friction disc which is keyed for rotation on the input shaft of the gear-box while being axially movable along the said shaft, this control being characterized in that unidirectional axial coupling means are provided between the said declutching stop and the pressure means which it carries, the said unidirectional axial coupling means being intended to permit a controlled axial displacement of the pressure means with respect to the declutching stop in the direction opposite to the direction of action of this stop, and to prevent any such displacement in the said direction of action, in cooperation with retaining means which are intended to be coupled to the casing of the gear-box and with which the said pressure means are capable of coming into engagement when the declutching stop which carries them moves in the direction opposite to its direction of action.

By this means, there exists from that moment, at the actual level of the declutching stop, an automatic take-up of play due to the wear of the friction disc fitted on the associated clutch.

In fact, in consequence of this wear, as and when the position of rest of the declutching stop with respect to the gear-box becomes modified, as explained above, the declutching stop moving further away from or closer to the gear-box, depending on whether the declutching stop acts by traction or by thrust respectively, the pressure means carried by this declutching stop for control of the inertia brake associated with the stop are, by the retention means provided for that purpose, maintained at a constant distance from the gear-box.

In consequence, irrespective of the wear of the friction disc of the clutch, and without it being necessary to carry out in service any adjustment whatever, the declutching stop is always in a position to apply the friction disc of the inertia-brake associated with the gear-box against the corresponding reaction surface, the corresponding braking travel only increasing eventually from the wear alone of the friction disc of the said inertia brake, which always remains small.

For any useful purpose, it is specified that the pressure means are action means intended to act by thrust or by traction, depending on whether the declutching stop acts by traction or by thrust respectively.

The term "pressure" does not therefore imply in this case any axial orientation whatever.

In the case of an abutment stop acting by traction, the retention means associated according to the invention with the pressure means carried by the declutching stop form ratchet means intended to be passed over elastically by the said pressure means in the direction of action of the declutching stop during the assembly of the unit.

This results advantageously in that such an assembly can be carried out in a very simple matter, blindfold.

The present invention has also for its object a clutch of the kind comprising a fly-wheel forming a reaction plate, a friction disc, a cover intended to be fixed to the said fly-wheel, a pressure plate coupled for rotation to the said cover and movable axially with respect to the cover, and elastic means which are supported on the said cover and which act on the said pressure plate for clamping the friction disc between the pressure plate and the reaction plate, under the control of declutching devices with which is associated a declutching stop, and a clutch of this kind is characterized in that its declutching stop carries a control of an inertia brake of the type briefly described above.

The hub of the friction disc of the clutch is preferably provided with a cylindrical bearing surface intended to permit temporary centering of the declutching stop during the assembly of the unit.

Also preferably, in the case of a clutch in which the elastic means which act on the pressure plate are of the diaphragm type having an annular peripheral portion in the form of a Belleville washer which constitutes the said elastic means and which acts on the said pressure plate and radial extensions in the form of fingers which constitute the associated declutching members and which extend in the direction of the axis, the internal periphery of the said fingers has a diameter greater than the largest diametral dimension of the declutching stop for the passage of the said diaphragm over the said declutching stop during the assembly of the unit.

From these two provisions, the advantageous result is that it is possible, during the construction of the clutch, to make the declutching stop separate from the clutch, even in the case of a declutching stop intended to act by traction, the assembly of this declutching stop being effected in a temporary manner during the placing in position of the clutch on the fly-wheel of the engine to which it is applied, and its positioning being only effected in a final manner at the moment of coupling the clutch to the associated gear-box.

In this connection, it should be emphasized that it is usual on the contrary to fix the declutching stop to the clutch mechanism, even during the assembly of the clutch, but within the framework of the arrangements forming the subject of the present invention, this could result in certain cases in an excessive overhang of the declutching stop with respect to the clutch mechanism on which it is carried.

In an alternative form, for the case of a clutch in which the clutch members are levers distinct from the associated elastic means, the assembly of the declutching stop may be of the bayonet joint type or of the quarter-turn type, associating an axial movement with the penetration of extensions of the declutching stop between the declutching levers, with a rotating movement beyond these latter.

The present invention has also for its object an assembly of the kind comprising successively a clutch and a gear-box equipped with an inertia brake, the said inertia brake comprising a reaction surface coupled to the casing of the gear-box, a friction disc which is keyed for rotation on the input shaft of the gear-box while being axially movable along the said shaft, and a control coupled to the declutching stop associated with the said clutch, such an assembly being characterized in that the said control is of the type briefly described above.

Preferably, especially when compensating means are not provided additionally, the friction disc of the inertia brake fitted on this unit is formed by two annular plates fixed together for rotation, having their central portions in contact with each other, possibly with the interposition of a ring, and their peripheral portions spaced apart axially from each other, the said peripheral portions carrying friction linings on their opposite faces.

The results of this arrangement is that, irrespective of any possible irregularity of action of the pressure means carried by the declutching stop, the force due to these pressure means is uniformly distributed circularly on the friction disc of the inertia brake, and that in consequence the operation of this latter remains satisfactory, the irregularity of the force of the pressure means acting on this friction disc causing at most a local fault of parallelism of the peripheral portions of the two plates with which it is provided.

The objects of the invention, their characteristic features and their advantages will furthermore be brought out in the description which follows below by way of example, reference being made to the accompanying diagrammatic drawings, in which.

Figure 1:
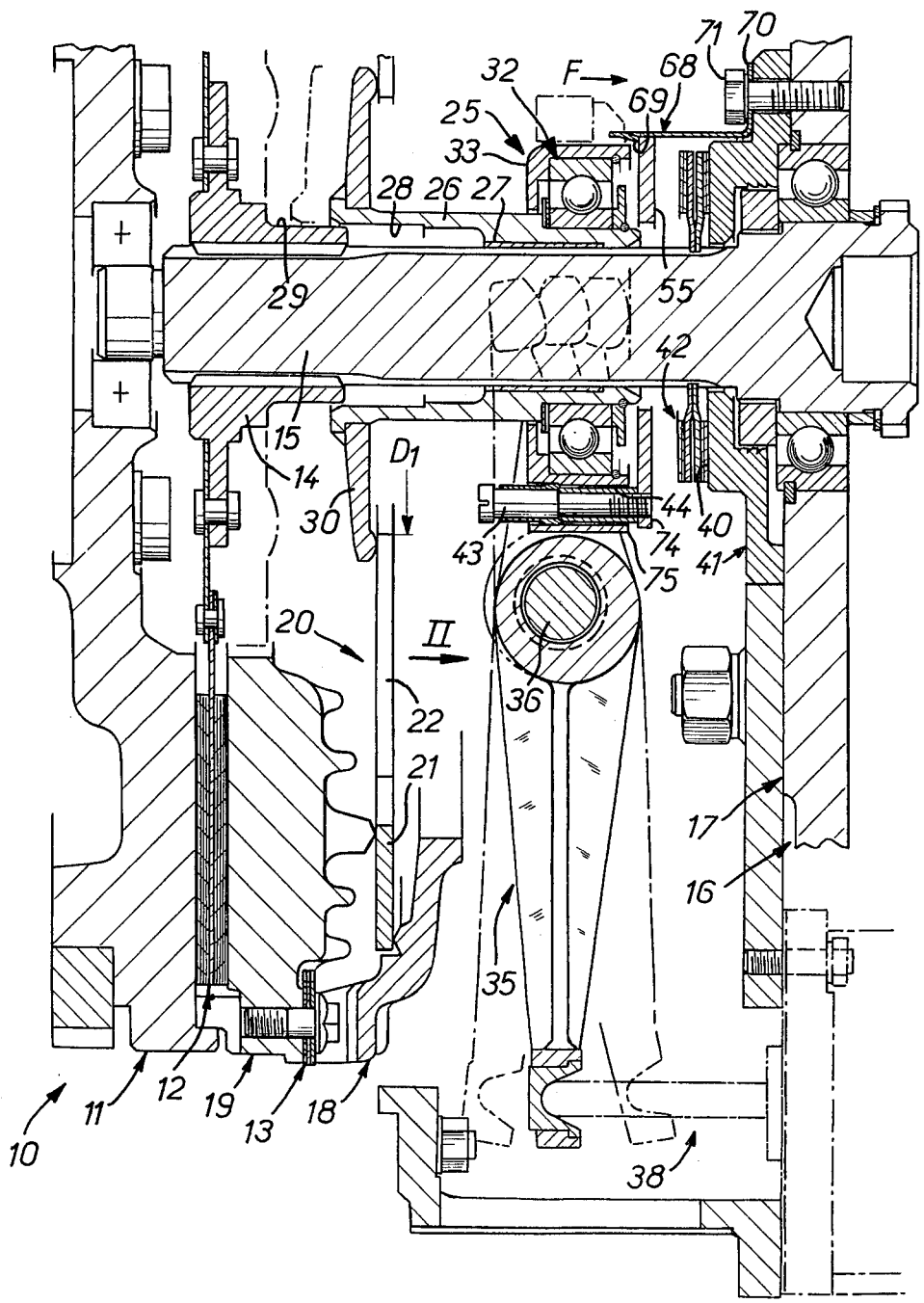
FIG. 1 is a partial view in axial cross-section of a clutch-gear-box assembly according to the invention, taken along the broken line I—I of FIG. 2.
Figure 8:
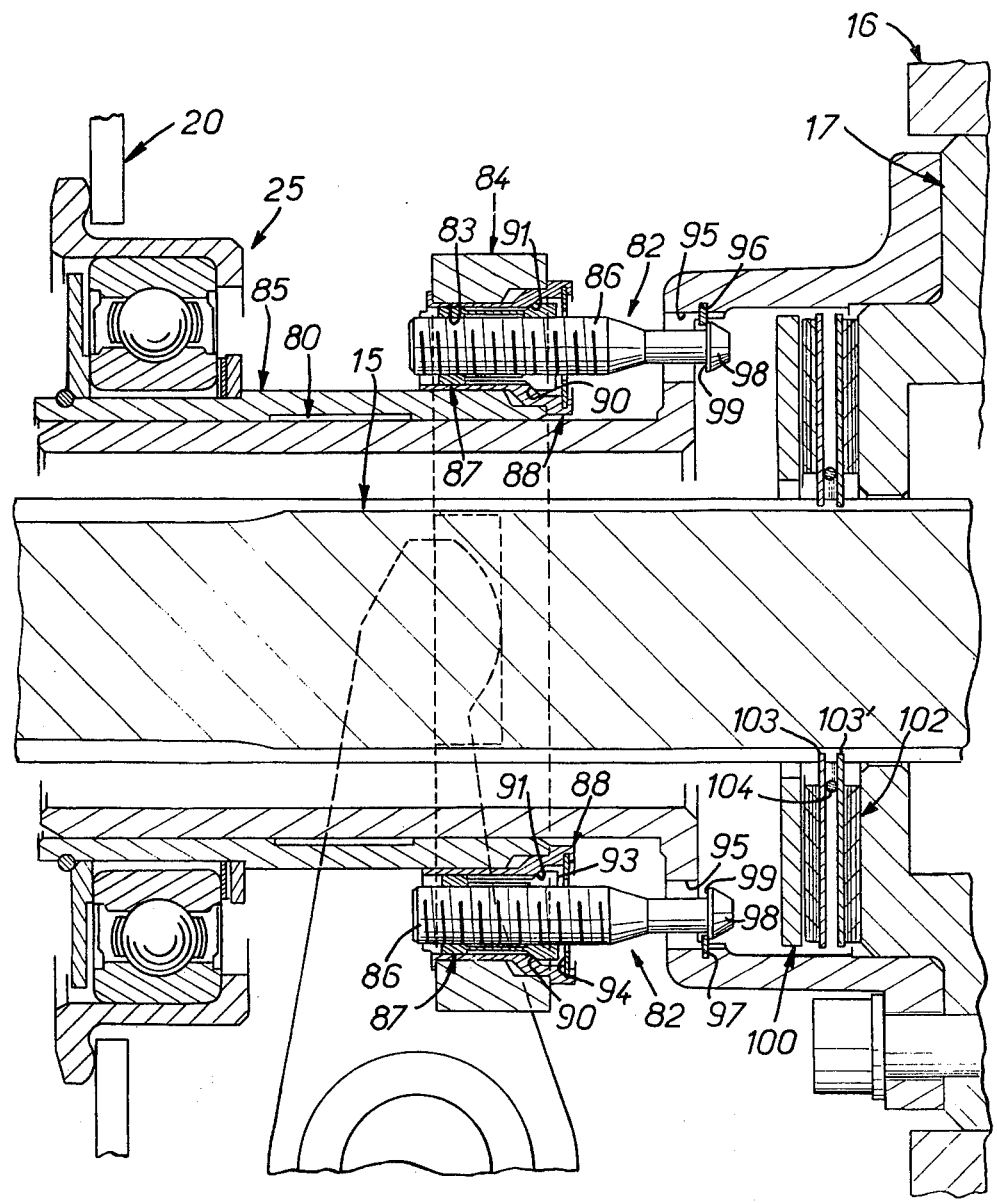
Figure 9:
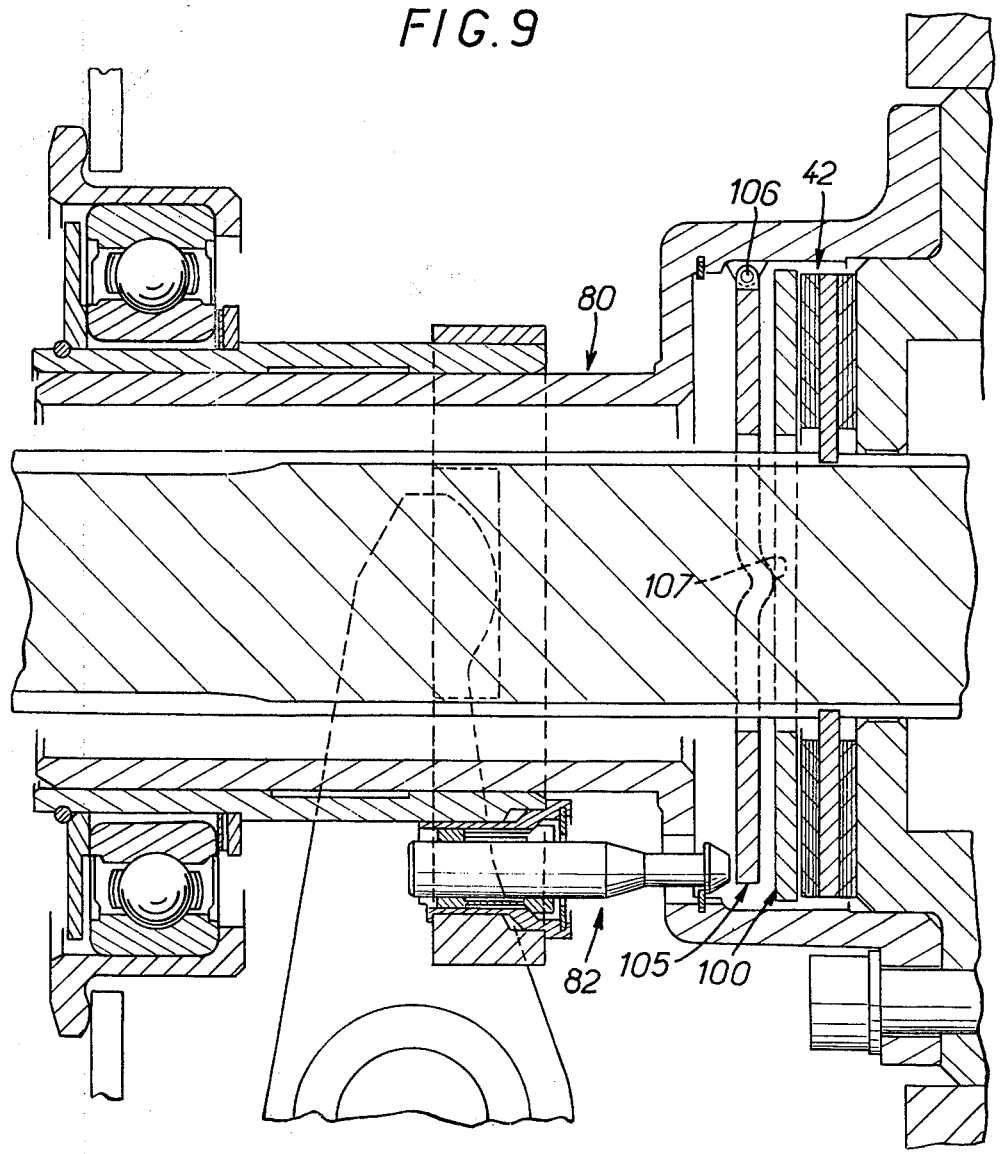
Figure 10:
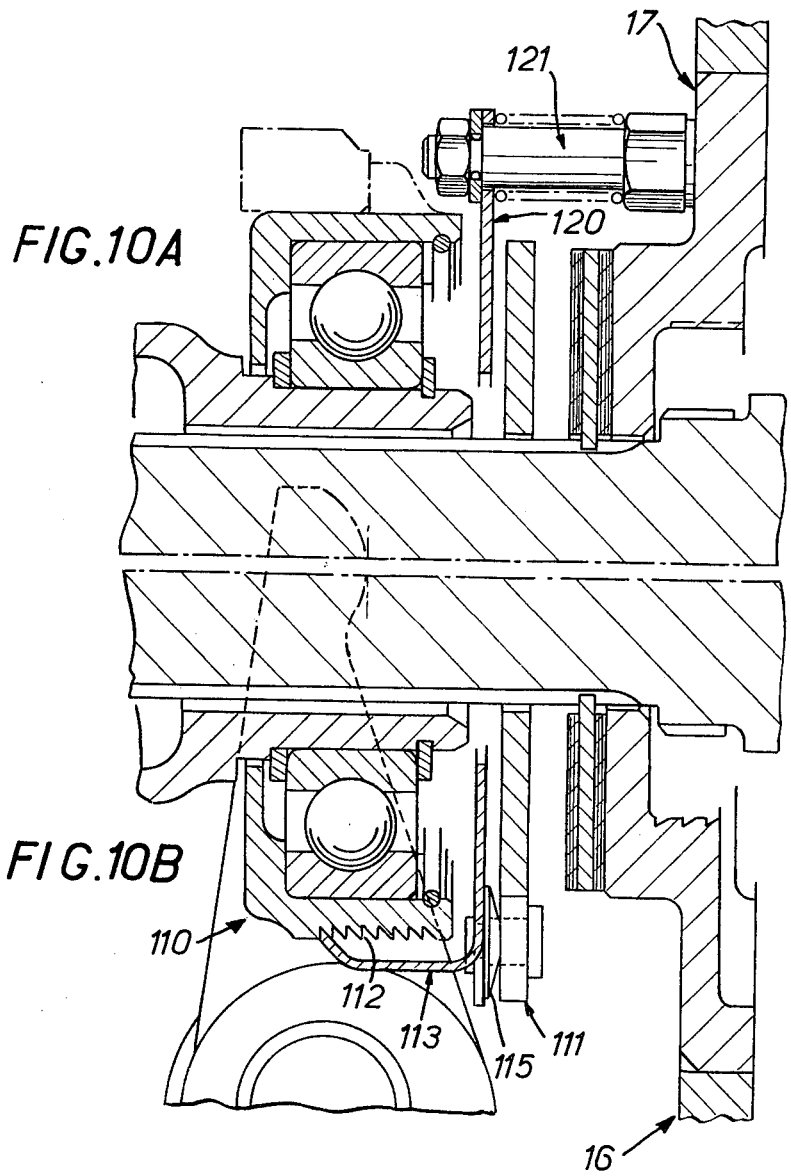
Figure 11:
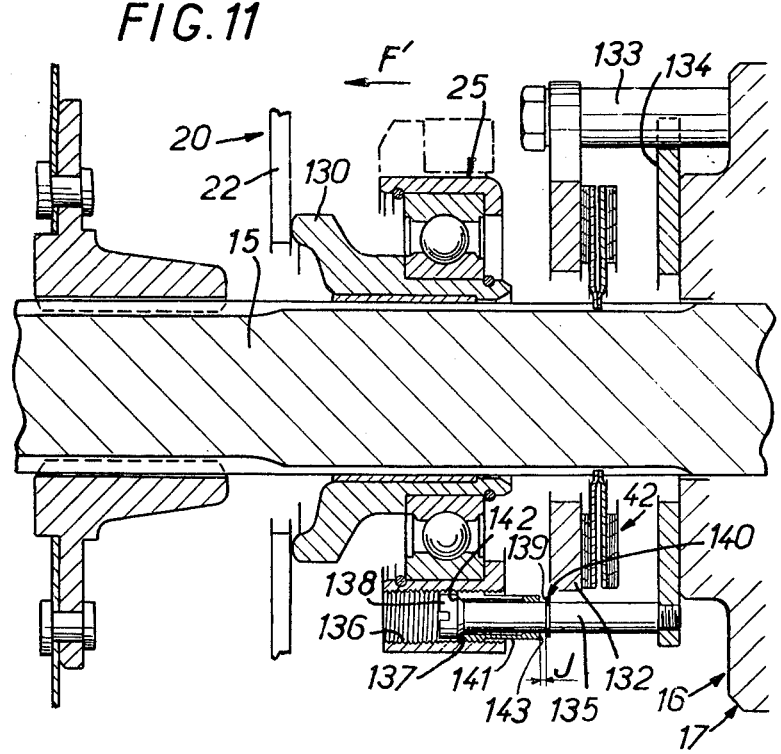
Figure 12:
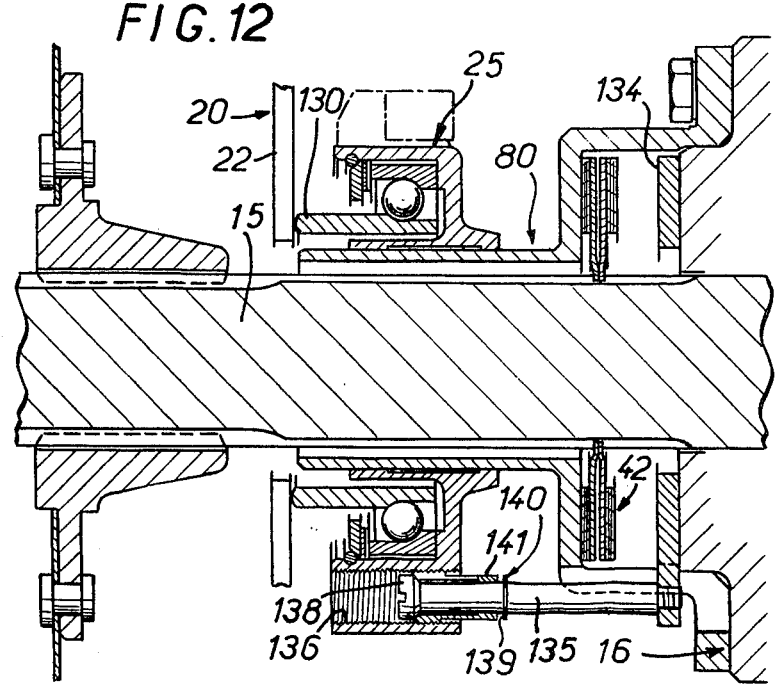

FIG. 3 reproduces a detail of FIG. 1 on a larger scale;

FIG. 4 is a partial view in transverse section taken along the line IV—IV of FIG. 3;

FIGS. 5, 6 and 7 are partial views similar to that shown in FIG. 1, and illustrating the method of action of the unidirectional axial coupling means utilized in accordance with the invention in the clutch-gear-box assembly concerned;

FIGS. 8 and 9 are partial views similar to that of FIG. 1 and are each concerned respectively with an alternative form of embodiment;

FIGS. 10A, 10B are two half-views in different axial sections of another alternative form of embodiment;

FIGS. 11 and 12 are partial views similar to that of FIG. 1, and are each respectively concerned with another alternative form of embodiment.

FIGS. 1 to 10 illustrate the application of the invention to clutch-gear-box assemblies in which the declutching stop associated with the clutch acts on the latter by traction.

In FIG. 1, the general reference number 10 has been given to the clutch in question.

A clutch of this kind does not form part of the present invention and is well known per se; it will therefore be described only briefly here.

It comprises in succession axially a fly-wheel 11, a friction disc 12 and a mechanism 13.

The fly-wheel 11 is intended to be keyed on a shaft (not shown) generally a driving shaft, and it is also intended to form a reaction plate for the associated friction disc 12.

The friction disc 12 is carried on a hub 14 mounted with splines on a shaft 15, generally a driven shaft, which forms the input shaft of a gear-box 16 of which only a portion of the corresponding front wall of the casing 17 is visible in FIG. 1.

The clutch mechanism 13 comprises a cover 18 capable of being fixed at its periphery on the fly-wheel 11, a pressure-plate 19 coupled for rotation with the cover 18 and movable axially with respect to this cover, and elastic means which are supported on the said cover and which act on the said pressure-plate for clamping the friction disc 12 between the pressure-plate and the reaction plate formed by the fly-wheel 11.

In practice, and as shown, the elastic means in question are constituted by a diaphragm 20 having an annular peripheral portion of the Belleville washer type, which acts on the pressure-plate 19 and is supported on the cover 18, and radial extensions 22 which extend in the direction of the axis and which form declutching fingers.

A clutch 10 of this kind is associated with a declutching stop 25.

In the example of construction shown in FIGS. 1 to 7, this declutching stop 25 is directly centered on the input shaft 15 of the gear-box 16.

It thus comprises a sleeve 26 engaged on the shaft 15 with the interposition of a bearing-bush 27.

At its extremity nearest to the clutch 10, the sleeve 26 is provided internally with a cylindrical bearing surface 28 having a diameter sufficient to permit its engagement on a cylindrical bearing surface 29 provided for that purpose on an axial extension of the hub 14 carrying the friction-disc 12.

Externally, at the extremity in question, the sleeve 26 is provided with a radial end-plate 30 having a diameter sufficient to be able to act on the free extremities of the declutching fingers 22 of the diaphragm 20, on that face of these fingers which is turned towards the friction-disc 12.

At its other extremity, the sleeve 26 carries a casing 33 with the interposition of a bearing 32.

In known manner, a declutching fork 35 is coupled to lateral bosses 34 on the casing 33, the fork being articulated on a fixed pivot 36 and on the other extremity of the fork a control of any kind 38 is capable of acting.

As mentioned above, an inertia brake is associated with the input shaft 15 of the gear-box 16. This inertia brake comprises a reaction surface 40 provided for that purpose on the cover 41 which closes the casing 17 of the gear-box in the usual manner around the input shaft 15 of the gear-box, a friction disc 42 which, by a splined mounting, is keyed for rotation of the said input shaft while being movable axially along this shaft, and a control coupled to the declutching stop 25 associated with the clutch 10.

Also in known manner, this control comprises pressure means carried by the declutching stop and intended, in response to the displacement of the stop corresponding to declutching, as will be explained later, hereinafter known as the direction of action, to apply the friction disc 42 against the reaction surface 40.

In FIG. 1, the direction of action in question has been indicated by the arrow F.

According to the invention, unidirectional axial coupling means are provided between the declutching stop 25 and the pressure means which it carries for action on the friction-disc 42.

In the forms of embodiment illustrated in FIGS. 1 to 9, these pressure means comprise at least one action finger 43 engaged in a bore 44 formed in the declutching stop 25 parallel to the axis of this latter, the associated unidirectional axial coupling means comprising a threaded portion of the cam-engaged ratchet thread type formed on any one of the members declutching stop 25, action finger 43 and a split socket 46 which is interposed between the said action finger 43 and the bore 44, and which has a threaded portion complementary to the previous thread, the said socket 46 being further provided, on the one hand with a radial supporting surface 47 adapted to co-operate in abutment with a shoulder 48 of the other of the said declutching stop members, action finger, and on the other hand a conical supporting surface 49 intended to co-operate by jamming with a complementary surface 50 formed on this same latter member.

In the example of construction shown in FIGS. 1 to 7, and as can more clearly be seen from FIG. 3, the thread portion which carries the reference 51 is formed in the bore 44 in which is engaged the action finger 43, and this bore 44 is directly formed in the casing 33 of the declutching stop 25, at the periphery of this latter.

In addition, in the example shown, a pressure plate 55 is coupled to the action finger 43, the plate being thus fixed for rotation and intended to come into contact with the associated friction disc 42. This pressure plate is arranged beyond the friction disc 42 with respect to the gear-box 16.

In practice, the action finger 43 is a screw, of which one threaded extremity 56 is engaged by screwing into a hole tapped for that purpose in the associated pressure plate 55.

On a smooth portion 57 of the body of this screw, and close to the screw head 58, is engaged the associated split-ring 46.

The free extremity of this ring close to the head 58 of the action finger 43 forms the radial bearing surface 47 of this ring intended to co-operate with a shoulder 58 on this finger, and this shoulder 48 is formed by the corresponding transverse face of the head 58 of the said finger.

The split ring 46 is made thinner over a portion of its length, and by dividing up by longitudinal slots 60 (see FIG. 4), this thinner portion forms, at a distance from the smooth cylindrical portion 57 of the body of the action finger 43, elastically-deformable lugs, four in number in the example shown, which carry at their free extremities a threaded portion complementary to the artillery-pitch thread provided in the bore 44 in which the action finger 43 is engaged.

At its extremity opposite to the head 58 of the action finger 43, the split socket 46 has a conical surface 49 provided for co-operation with a complementary conical surface 50 formed on the action finger 43.

In the example shown, this conical surface 50 is formed at the end of a spacing ring 65 interposed between the pressure plate 55 and a shoulder 66 forming the transverse end face of the smooth cylindrical portion 57 of the body of the action finger 43.

In operation, the conical surfaces 49 and 50 are in contact with each other, and a clearance J subsists between the radial bearing surface 47 provided at the other extremity of the split-ring 46 and the corresponding shoulder 48 of the action finger 43.

With the unidirectional axial coupling means thus constituted, the operation of which will be described later, there are associated, according to the invention, retaining means intended to be coupled to the casing 17 of the gear-box 16 and with which the pressure means carried by the declutching stop 25 are capable of coming into engagement when this declutching stop is moved in the direction opposite to its direction of action.

In the examples of construction illustrated by FIGS. 1 to 9, these retaining means form ratchet means intended to be passed-over elastically by the said thrust means in the direction of action concerned.

More precisely, in the form of embodiment illustrated by FIGS. 1 to 7, these ratchet means comprise at least one claw 68 which is parallel to the axis, which carries at its free extremity a retention projection 69 intended to co-operate with the pressure-plate 55, and which is elastically deformable.

In the example shown, such a claw 68 has a return portion 70 permitting its fixing by a screw 71 to the cover 41 of the gear-box 16.

Figure 2:
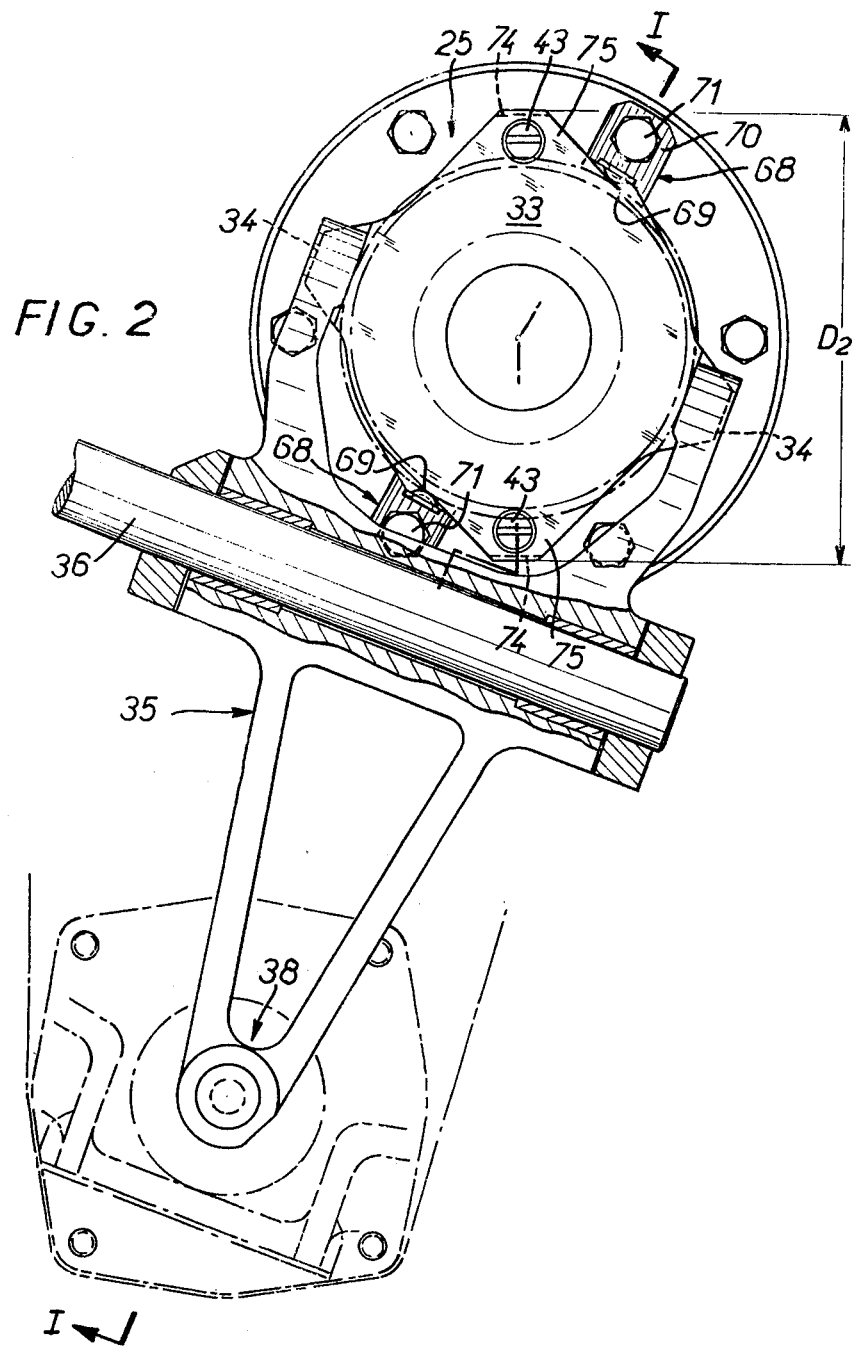
FIG. 2 is a partial transverse view of this assembly in the direction of the arrow II of FIG. 1.

As can be more clearly seen from FIG. 2, two claws 68 are thus provided at diametrically-opposite positions, and similarly there are two action fingers 43 arranged at diametrically-opposite positions, and overlapping circularly with the claws 68.

In practice, for the installation of the action fingers 43, the pressure-plate 55 has diametrically-opposite radial lugs 74.

Similarly, the casing 33 of the declutching stop 25 is provided for the same purpose with diametrically-opposite bosses 75 which alternate with the bosses 34 which it additionally comprises for the action of the declutching fork 35.

According to a particular arrangement in conformity with the invention, the internal periphery of the declutching fingers 22 of the diaphragm 20 has a diameter D1 slightly greater than the diametral largest dimension D2 of the declutching stop 25, this diametral dimension D2 being taken from one of the bosses 34 or 75 of this declutching stop to the other.

Furthermore, following an arrangement which is also particular to the invention, the friction disc 42 of the inertia brake associated with the input shaft 15 of the gear-box 16 is formed by two annular plates 76, 76′, fixed together for rotation.

In the example shown in FIGS. 1 to 7, these plates have their central portions 77′, 77 in contact with each other, while their peripheral portions 78, 78 are spaced apart axially from each other, the said peripheral portions 78, 78′ each carrying on their opposite faces friction linings 79, 79′ respectively. These plates 77, 77′ are elastically deformable axially.

The assembly of the clutch-gear-box unit according to the invention is carried out in the following manner:

First of all in the case of the clutch 10, this assembly is effected in the usual manner from the fly-wheel 11.

The placing in position of the friction disc 12 is effected by means of a dummy shaft which is mounted in a temporary manner for that purpose on the fly-wheel 11 and which enables the friction disc 12 to be centered with respect to the fly-wheel.

The declutching stop 25 is then engaged over this dummy shaft until the internal breaking surface 28 of its sleeve 26 becomes engaged on the surface 29 which is provided on the hub 14 of the friction disc 10, as shown diagrammatically in broken lines in FIG. 1, which ensures the positioning and the centering of the declutching stop.

The mechanism 13 of the clutch is then placed in position, by passing this mechanism over the declutching stop 25, which is possible since the diameter D1 of the internal periphery of the declutching fingers 22 has been provided sufficient for that purpose, as explained previously.

After fixing the cover 18 of the mechanism 13 on the fly-wheel 11, the friction disc 12 is gripped between the fly-wheel 11 and the pressure-plate 19 to an extent sufficient to permit its maintenance in position and its centering, so that the dummy shaft which was temporarily mounted can be removed.

At the same time, the gear-box 16 with which this clutch is to be associated is equipped with claws 68, and a friction disc 42 is engaged on its input shaft 15.

It is then only necessary to engage the input shaft 15 of the gear-box 16 in the hub 14 of the clutch 10, to fix the gear-box 16, to place the declutching fork 35 in position with respect to the declutching stop 25, and then to move the latter back until its radial end-plate 30 makes contact with the internal faces of the declutching fingers 22 as indicated in full lines in FIG. 1.

As will have been noted, this assembly is carried out so to speak blindfold and does not necessitate in practice any particular adjustment, as will become apparent later.

During the first declutching operation, the declutching stop 25 which is displaced by the declutching fork 35 in the axial direction of action indicated by the arrow F, pulls on the declutching fingers 22 which causes the release of the pressure plate 19 by the diaphragm 20 and ensures the release of the friction disc 12 of the clutch 10.

During the corresponding declutching travel of the declutching stop 25 in the direction of action F, the pressure plate 55 carried by this declutching stop passes elastically over the projections 69 of the claws 68 if it has not already done so during the return movement of the declutching stop having led this latter during assembly to its initial position of rest, and then continuing this declutching travel, it comes into contact with the friction disc 42 of the inertia brake associated with the input shaft 15 of the gear-box 16 (see FIG. 5).

From then on, the pressure-plate 55 and the action fingers 43 to which it is coupled are retained axially with respect to the casing 33 of the declutching stop 25 which carries them.

In consequence, if the axial movement of the declutching stop 25 is continued in the direction of action F, the split sockets 46, irrespective of their initial position with regard to their respective action fingers 43, make contact by their conical supporting surface 49 with the complementary conical surface 50 provided for that purpose on the corresponding spacing rings 65.

As these spacing rings 65 are supported on the pressure-plate 55, the contact between the conical bearing surfaces 49 and 50 causes the lugs 61 of the sockets 46 to become elastically moved apart radially towards the exterior, which causes their threaded portions to come forcibly into engagement with the thread portion 61 provided on the corresponding bores 44.

As is well known, cam-engaged ratchet thread is a thread having an asymmetric profile of section.

As can more clearly be seen from FIG. 3, the steepest flank of such a thread is arranged on the side opposite to the gear-box 16. In consequence, if the displacement of the declutching stop 25 in the direction of action F is continued, this declutching stop displaces the split sockets 46 and these latter in their turn displace the spacing rings 65 in the same direction and thereby actuate the pressure-plate 55 and the action fingers 43 to which this latter is coupled.

For this direction of action F there is in fact produced a positive coupling between the pressure-plate 55 and the declutching stop 25 which carries it.

The pressure-plate 55 is thus able to grip the friction-disc 42 against the reaction surface 40 provided for that purpose on the casing 17 of the gear-box 16.

The input shaft 15 of the gear-box is slowed down from that time, which facilitates the engagement of a gear ratio.

When the declutching control applied on the declutching fork 35 is released, the diaphragm 20 again ensures the clamping of the friction disc 12 of the clutch 10 and consequently brings back the declutching stop 25 to its position of rest.

During the return of the declutching stop 25 to its initial position of rest, the pressure-plate 55 comes into engagement with the projections 69 of the claws 68 carried by the casing 17 of the gear-box 16, as shown in FIG. 1.

The pressure-plate 55 is from that time held axially with respect to the declutching stop 25.

If, as is the case, this stop continues its travel in the direction opposite to the direction of action F, in a first stage it displaces the split sockets 46 until the clearance J provided between the free extremities of these sockets and the heads 58 of the corresponding action fingers 43, (see FIG. 6).

By the abutment of their supporting surface 47 against the corresponding shoulder 48 of the heads 58 of the action fingers 43, the split sockets 46 are from that time retained by these action fingers 43 which, coupled to the pressure-plate 55, are themselves retained axially with respect to the declutching stop, as stated above.

In consequence of the absorption of the clearance J, the split socket 46 have lost contact with the spacing rings 65, so that their lugs 61 are free to move elastically and radially towards the interior and can temporarily escape engagement with the threaded portion 51 of the corresponding bores 44.

In consequence, if by reason of wear of the friction disc 12 of the clutch 10, the position of rest of the declutching stop 25 for the engaged position of the clutch becomes progressively displaced in the direction of this clutch, the thread 51 of the bores 44 of this declutching stop 25 passes notch by notch over the complementary threaded portion provided on the split socket 46, this passage being permitted by elastic deformation towards the interior of the lugs 61 of these split sockets (see FIG. 7).

For the direction of displacement opposite to the direction of action F, the pressure-plate 55, which is retained axially by the claws 68, is therefore not coupled to the declutching stop 25 on which it is carried.

The travel necessary for the pressure-plate 55 to return into contact with the associated friction disc 42 thus remains advantageously constant, as shown diagrammatically at C in FIG. 3, irrespective of the wear of the friction disc 12 of the clutch 10, and this travel becoms automatically adjusted to its value during the subsequent r-engagement following the first declutching action, without any particular ajustment being necessary for that purpose, as previously stated.

It will be understood that, during a clamping of the friction-disc 42 by the pressure-plate 55, the particular constitution of this friction-disc in two plates spaced apart axially and elastically from each other at their periphery, and being deformable, makes it possible advantageously to prevent a possible dephasing in time of the actions of the two action fingers 43 with respect to each other, or in other words a possible defect of parallelism of the pressure-plate 55 with respect to the associated reaction surface 40.

It will also be understood that the elastic passing-over by the ring 55 of the projections 69 of the claws 68, which results in a ratchet coupling of this plate on these claws, is effected by elastic deformation of the said claws.

The alternative form of embodiment illustrated by FIG. 8 relates to the case of a clutch-gear-box unit in which the declutching stop 25 associated with the clutch is not directly centered on the input shaft 15 of the associated gear-box 16, but on a sleeve 80 commonly known as a trumpet, which surrounds the input shaft 15 and which is fixed to the casing 17 of the gear-box 16.

In such a case, the declutching stop 25 is preferably a self-centering stop, as shown, mounted as close to the diaphragm 20 with which it is to co-operate as possible.

As previously, the declutching stop 25 comprises, parallel to its axis and with the interposition of unidirectional axial coupling means, two action fingers 82 arranged at diametrically-opposite positions.

In the example shown in FIG. 8, these action fingers 82 are engaged in bores 83 formed in a ring 84 fixed on a sleeve 85 coupled axially to the declutching stop 25, and it is at their periphery that there is formed an artillery-pitch threaded portion 86.

Between each action finger 82 and the corresponding bore 83 are successively interposed, on the one hand a split socket 87 and on the other hand a socket 88 inset on the ring 84.

This arrangement is especially convenient in the case where, especially for reasons of hardness, it is not possible or desirable to form a threaded bore in the casing of the declutching stop directly.

The split socket 87 is provided as previously with elastically deformable lugs, and at the free extremities of these lugs, on their internal surface, is formed a threaded portion complementary to the artillery-pitch thread 86 formed peripherally on the corresponding action finger 82 for co-operation with this letter.

Externally, the split socket 87 has a conical supporting surface 90 for co-operation by wedging action with a complementary conical bearing surface 91 formed for that purpose on the socket 88 which surrounds it.

At the free extremities of its lugs, the split socket 87 also forms a radial supporting surface 93 intended to co-operate in abutment with a shoulder 94 formed integrally with the socket 88 which surrounds it.

In the example shown, this shoulder 94 is formed by a split elastic ring engaged in a groove provided for that purpose in the extremity of the socket 88.

Opposite the action fingers 82, the trumpet 80 has passages 95, and beyond these passages, a groove 96 in which is engaged a split elastic ring 97.

This split elastic ring 97 is intended to form the retaining means provided according to the invention for the pressure means which are furthermore constituted by the action fingers 82.

To this end, these action fingers 82 each have a conical head 98 intended to ensure an elastic withdrawal of the split ring 97 during their engagement in the passages 95 of the trumpet 80, these conical heads 98 being provided radially with a shoulder 19 intended to co-operate in retention with the split elastic ring 97 after its ratchet action on this latter.

By split elastic ring, there is meant here in a conventional manner a ring opened by a slot and capable of elastic movement radially.

As previously, a pressure-plate 100 is associated with the action fingers 82, but in the example shown, this pressure-plate is free with respect to the action fingers 82.

The pressure-plate 100 is of course fixed against rotation with respect to the associated friction disc 102, for example by means of studs fixed on the pressure-plate 100, these studs being engaged in holes in the trumpet 80 intercalated with the passages 95 of this letter (not shown in the drawings).

In the example shown, the friction disc 102 is formed as previously by two small annular plates 103, 103', but the latter are rigid and between their central positions is interposed a keeper ring 104 adapted to introduce by swivel action a rocking effect similar to that described above.

The operation of this alternative construction is similar in all respects to that described above with reference to FIGS. 1 to 7.

In accordance with the alternative form of embodiment illustrated in FIG. 9, a single action finger 82 is provided.

Between this single action finger 82 and the pressure-plate 100 is interposed a swivelling element constituted by an annular plate 105 in the example shown.

This annular plate 105 on which the action finger 82 can act, is articulated at 106 on the trumpet 80, at a supporting point diametrically opposite with respect to the point of action of the action finger 82 on this annular plate 105 and constituted by a pivot in the example shown.

This annular plate 105 is further provided, as a projection between its pivot 106 and the operating point of the action finger 82, with an articulation surface 107 intended to come into contact with the associated pressure-plate 100. This action surface is in practice preferably in the vicinity of the axis of the unit and comprises two supporting zones arranged in diametrically-opposite positions on each side of the said axis.

As will readily be understood, the result of this arrangement is a swivelling effect ensuring a uniform distribution over the pressure-plate 100 of the force applied to the annular plate 105 by the single action finger 82.

In accordance with the alternative form of embodiment illustrated by FIGS. 10A and 10B, the pressure means carried by the declutching stop 110 comprise an annular pressure plate 111 and the unidirectional axial coupling means interposed between this declutching stop 110 and the pressure plate 111 comprise at least one toothed ramp 112 with asymmetrical teeth coupled to the declutching stop 110 and parallel to the axis of this latter. In practice there are preferably two toothed ramps 112 arranged in diametrically opposite positions with respect to each other.

With each of these toothed ramps 112, there is intended to co-operate a pawl 113 coupled to the pressure-plate 111 and held elastically in engagement with the said ramp 112.

In the example shown, this pawl 113 is constituted by an elastically-deformable metal strip so that it constitutes in itself the elastic means intended to keep it in engagement with the ramp 112.

In addition, in the example shown, a Belleville washer 115 is interposed between the pressure-plate 111 and each of the retaining pawls 113 carried by this plate.

This Belleville washer 115 advantageously ensures a swivel effect during the clamping of the associated friction disc 116 by the pressure-plate 111.

In the case where a single pawl 113 is provided, there is preferably associated with it a swivel element, for example of the same type as that described with reference to FIG. 9.

As previously, with the pressure means constituted by the pressure-plate 111, there are associated retaining means constituted, in the example shown, by small tongues 120 fixed by pillars 121 to the casing 17 of the gear-box 16, and interposed between the pressure-plate 111 and the declutching stop 110.

The operation of this alternative form of construction is in all respects similar to that described above with reference to FIGS. 1 to 7.

It will of course be understood that the present invention is not restricted to the forms of embodiment described and illustrated, but includes any alternative form of construction and/or any alternative combination of their various parts.

In particular, the method of construction of the unidirectional axial coupling means provided according to the invention between the declutching stop and the pressure means carried by the said stop is indifferent.

Such unidirectional axial coupling means may, for example, be of the type which it is usual to employ in brakes for automatically taking-up the play due to wear of the friction linings of the braking elements comprised in such brakes.

It will furthermore be clear that these unidirectional axial coupling means may be hydraulic instead of being mechanical, as is also known for brakes.

The present invention does not consist of such unidirectional axial coupling means taken by themselves, but of their application to the operation, by a declutching stop, of the inertia brake of a gear-box.

Furthermore, the invention is not limited to the case of clutches in which the associated declutching stops act by traction. On the contrary, it quite clearly extends to the case in which such declutching stops act by thrust.

This possibility is illustrated by FIGS. 11 and 12.

FIG. 11 relates to the case in which, as in FIG. 1, the declutching stop 25 is centered on the input shaft 15 of the gear-box 16.

In a manner known per se, it comprises an axial extension 130 intended to act in thrust on the radial extensions 22 of the diaphragm 20 of the associated clutch, in a direction of action indicated by an arrow F' in FIG. 11.

The pressure means carried by this declutching stop must be capable of pressing the friction disc 42 of the associated inertia brake, not against the front face of the casing 17 of the gear-box 16, but against a reaction-plate 132 fixed by pillars 133 on this front face, parallel to this latter.

These pressure means therefore no longer constitute thrust means as previously, but traction means.

They comprise a pressure-plate 134 arranged axially between the friction disc 42 and the gear-box 16 and coupled to tie-rods 135 coupled to the declutching stop 25 by unidirectional axial coupling means, which, in the example of construction shown in FIG. 11, are of the same type as those described with reference to FIGS. 1 to 7.

Each of the tie-rods 135 which forms the equivalent of an action finger described above, is engaged in a bore 136 of the casing of the declutching stop 25 having an artillery-pitch threaded portion and, between a conical bearing surface 137 formed on its head 138 and a radial shoulder 139 formed by a circlip 140 which is mounted on it, it is surrounded by a split socket 141 which on the one hand is provided externally with an artillery-pitch thread complementary to that of the bore 136 and which on the other hand comprises at one extremity a conical supporting surface 142 complementary to the conical surface 137 for co-operation with this latter, and at the other extremity a radial supporting surface 143 for co-operation with the radial shoulder 139, a clearance J being left at this level between the split socket 141 and the circlip 140 carried by the tie-rod 135.

The steepest flank of the artillery-pitch threaded portions utilized is located in this case on the side of the gear-box 16.

The operation of this alternative form is in all respects similar to that described with reference to FIGS. 1 to 7, with the difference that the retaining means further associated with the pressure means are simple abutment means constituted by the actual front wall of the casing 17 of the gear-box 16. When the pressure-plate 134 comes into contact with this front wall, the clearance J being absorbed, the split socket 141 is disengaged from the artillery-pitch threaded portion of the bore 136, which enables the tie-rod 135 to move forward in the bore 136 according to the wear of the friction disc of the associated clutch.

According to the alternative form of construction illustrated in FIG. 12, the declutching stop 25 is carried by a trumpet 80, on which furthermore is formed the reaction surface associated with the friction disc 42 of the inertia brake.

Finally, the application of the invention is not restricted to clutches of the diaphragm type; on the contrary, it extends to cover equally well lever-type clutches, as already referred to above.

What I claim is:

1. An operating control for an inertia brake for an input shaft of a gear-box, of the kind including a gear-box casing, a clutch for coupling said input shaft to a drive unit, a declutching stop carried by said input shaft for declutching said clutch, a friction disc keyed on said input shaft for rotation therewith and for axial sliding thereon, said gear-box casing having a reaction surface engageable by said friction disc, pressure means carried by said declutching stop and adapted, in response to an axial displacement of said declutching stop in a clutch declutching direction to apply against said reaction surface said friction disc, said brake operating control further comprising unidirectional axial coupling means provided between said declutching stop and said pressure means carried by said declutching stop, said unidirectional axial coupling means being operable on the one hand to permit controlled axial displacement of the pressure means with respect to said declutching stop in the direction opposite to the clutch declutching movement of said declutching stop and on the other hand to prevent such axial displacement, and retaining means having means for coupling to the casing of the gear-box and positioned for engagement by said pressure means when the declutching stop carrying said pressure means is displaced in the direction opposite to its clutch declutching movement, said declutching stop having a bore rigidly fixed thereon parallel to the axis of said output shaft, said pressure means comprising at least one action finger engaged in said bore, said unidirectional axial coupling means comprising a threaded portion of the cam-engaged ratchet type, rigidly fixed on a selected one of the declutching stop and action finger, and a split socket interposed between said action finger and the bore in which said action finger is engaged and which has a threaded portion complementary to said first-mentioned threaded portion, said socket being further provided with a radial supporting surface cooperating in abutment with a shoulder fixed on the non-selected one of said declutching stop and action finger, and a conical supporting surface cooperating by wedging action with a complementary bearing surface fixed on said non-selected one of said declutching stop and action finger.

2. A clutch of the kind comprising a fly-wheel forming a reaction plate and defining an axis of rotation, a friction disc, a cover fixed to said fly-wheel, a pressure-plate coupled for rotation with said cover and movable axially with respect thereto, and elastic means supported on said cover and acting on said pressure-plate for gripping said friction disc between the pressure-plate and the reaction plate, declutching devices for controlling said elastic means, and a declutching stop associated with said declutching devices, said declutching stop carrying pressure means and an inertia-brake control for controlling the operation of a friction disc brake to be engaged with a casing of an associated gear-box, said inertia-brake control comprising unidirectional axial coupling means provided between said declutching stop and said pressure means carried by said declutching stop, said unidirectional axial coupling means being operable on the one hand to permit controlled axial displacement of the pressure means with respect to said declutching stop in the direction opposite to the clutch declutching movement of said declutching stop and on the other hand to prevent such axial displacement, retaining means having first means for coupling to the casing of the gear-box and second means positioned remote from said first means for engagement by said pressure means when the declutching stop carrying said pressure means is displaced in the direction opposite to its clutch declutching movement, said friction disc having a hub provided with a cylindrical bearing surface for effecting the temporary centering of said declutching stop during the assembly of the unit.

3. A clutch of the kind comprising a fly-wheel forming a reaction plate and defining an axis of rotation, a friction disc, a cover fixed to said fly-wheel, a pressure-plate coupled for rotation with said cover and movable axially with respect thereto, and elastic means supported on said cover and acting on said pressure-plate for gripping said friction disc between the pressure-plate and the reaction plate, declutching devices for controlling said elastic means, and a declutching stop associated with said declutching devices, said declutching stop carrying pressure means and an inertia-brake control for controlling the operation of a friction disc brake to be engaged with a casing of an associated gear-box, said inertia-brake control comprising unidirectional axial coupling means provided between said declutching stop and said pressure means carried by said declutching stop, said unidirectional axial coupling means being operable on the one hand to permit controlled axial displacement of the pressure means with respect to said declutching stop in the direction opposite to the clutch declutching movement of said declutching stop and on the other hand to prevent such axial displacement, retaining means having first means for coupling to the casing of the gear-box and second means positioned remote from said first means for engagement by said pressure means when the declutching stop carrying said pressure means is displaced in the direction opposite to its clutch declutching movement, the elastic means which act on said pressure-plate being of the diaphragm type having an annular peripheral portion in the form of a Belleville washer, said declutching devices being in the form of fingers which extend in the direction of the axis, said Belleville washer acting on said pressure-plate and said fingers, the internal periphery of said declutching fingers having a diameter greater than the largest diametral dimension of said declutching stop for the passage of said elastic means over said declutching stop during the assembly of the clutch.

4. An operating control for an inertia brake for an input shaft of a gear-box, of the kind including a gear box casing, a clutch for coupling said input shaft to a drive unit, a declutching stop carried by said input shaft for declutching said clutch, a friction disc keyed on said input shaft for rotation therewith and for axial sliding thereon, said gear-box casing having a reaction surface engageable by said friction disc, pressure means carried by said declutching stop and adapted, in response to an axial displacement of said declutching stop in a clutch declutching direction, to apply against said reaction surface said friction disc, said brake operating control further comprising unidirectional axial coupling means provided between said declutching stop and said pressure means carried by said declutching stop, said unidirectional axial coupling means being operable on the one hand to permit controlled axial displacement of the pressure means with respect to said declutching stop in the direction opposite to the clutch declutching movement of said declutching stop and on the other hand to prevent such axial displacement, and retaining means positioned for engagement by said pressure means when the declutching stop carrying said pressure means is displaced in the direction opposite to its clutch declutching movement, said declutching stop having a bore rigidly fixed thereon parallel to the axis of said input shaft, said pressure means comprising at least one action finger engaged in said bore, said unidirectional axis coupling means comprising a threaded portion of the cam-engaged ratchet type, rigidly fixed on a selected one of the declutching stop and action finger, and a split socket interposed between said action finger and the bore in which said action finger is engaged and which has a threaded portion complementary to said first-mentioned threaded portion, said socket being further provided with a radial supporting surface cooperating in abutment with a shoulder fixed on the non-selected one of said declutching stop and action finger, and a conical support surface cooperating by wedging action with a complementary bearing surface fixed on said non-selected one of said declutching stop and action finger.

5. A control as claimed in claim 4, in which said ratchet type threaded portion is formed in the bore of the declutching stop in which said pressure finger is formed.

6. A control as claimed in claim 4, in which said ratchet type threaded portion is formed at the periphery of said action finger.

7. A control as claimed in claim 4, in which the bore of the declutching stop in which said action finger is engaged is formed directly in said declutching stop at the periphery of said stop.

8. A control as claimed in claim 4, in which the bore of the declutching stop in which said action finger is engaged is formed in a ring fixed on a sleeve coupled axially to said declutching stop.

9. A control as claimed in claim 4, in which said action finger is associated with an annular pressure plate fixed against rotation and movable into contact with said friction disc.

10. A control as claimed in claim 9, in which coupling means couple said pressure plate to said action finger.

11. A control as claimed in claim 9, in which said pressure plate is free with respect to said action finger.

12. A control as claimed in claim 9, in which there are two action fingers diametrically opposite to each other.

13. A control as claimed in claim 11, in which there is only one action finger and a swivelling element is interposed between this finger and said pressure-plate, said swivelling element being an element on which said action finger can act and being articulated on a supporting point fixed on the casing of the gear-box diametrically-opposite to the point of action of said action finger, said swivelling element further comprising, as a projection between said action finger and said pressure plate an articulation surface movable into contact with said pressure plate.

14. A control as claimed in claim 13, in which said articulation surface comprises two articulation zones arranged at diametrically-opposite positions with respect to the axis of the unit.

15. A control as claimed in claim 4 in which said retaining means includes ratchet means adapted to be passed over elastically by said thrust means in the direction of clutch declutching movement of said declutching stop.

16. A control as claimed in claim 15, in which said ratchet means comprise at least one claw parallel to the axis of said input shaft, said claw carrying at a free extremity thereof an elastically deformable retention projection.

17. A control as claimed in claim 15, in which said ratchet means comprise a split elastic ring.

18. A control as claimed in claim 4, in which there are retaining means associated with said pressure means in the form of simple abutment means.

19. A unit as claimed in claim 4, in which said clutch comprises, a friction disc, a cover having means for securement to a fly-wheel, a pressure-plate coupled for rotation with said cover and movable axially with respect thereto, and elastic means supported on said cover and acting on said pressure-plate for urging said friction disc away from said cover, and declutching devices for controlling said elastic means.

20. A unit as claimed in claim 4, in which the friction disc of said inertia brake is formed by two annular plates having their central portions in contact with each other, and their peripheral portions spaced apart axially from each other, said peripheral portions carrying friction linings on their opposite faces.

21. A unit as claimed in claim 4, in which said declutching stop is adapted to act in traction on the associated clutch, and said inertia brake pressure means is disposed axially beyond the associated friction disc with respect to the gear-box.

22. A control as claimed in claim 4, in which said declutching stop is operable by thrust on the associated clutch, said inertia brake including a pressure plate disposed axially between the associated friction disc and the gear-box.

* * * * *